United States Patent
Herbert, Jr. et al.

(10) Patent No.: US 10,223,451 B2
(45) Date of Patent: *Mar. 5, 2019

(54) RANKING SEARCH RESULTS BASED UPON CONTENT CREATION TRENDS

(75) Inventors: Stephen L. Herbert, Jr., Somerville, MA (US); Tolga Oral, Winchester, MA (US); Michael W. Sorenson, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 563 days.

This patent is subject to a terminal disclaimer.

(21) Appl. No.: 13/160,487

(22) Filed: Jun. 14, 2011
(Under 37 CFR 1.47)

(65) Prior Publication Data

US 2012/0323908 A1    Dec. 20, 2012

(51) Int. Cl.
*G06F 17/30* (2006.01)

(52) U.S. Cl.
CPC .................. *G06F 17/30864* (2013.01)

(58) Field of Classification Search
None
See application file for complete search history.

(56) References Cited

U.S. PATENT DOCUMENTS

| | | | |
|---|---|---|---|
| 7,664,744 B2* | 2/2010 | Guha | 707/723 |
| 8,527,524 B2* | 9/2013 | Acharya | G06F 17/30864 707/749 |
| 8,744,978 B2* | 6/2014 | Zhuang et al. | 706/12 |
| 8,838,599 B2* | 9/2014 | Xu et al. | 707/737 |
| 2002/0078045 A1* | 6/2002 | Dutta | 707/7 |
| 2005/0234877 A1* | 10/2005 | Yu | 707/3 |
| 2007/0143300 A1* | 6/2007 | Gulli et al. | 707/10 |
| 2007/0214131 A1* | 9/2007 | Cucerzan et al. | 707/5 |
| 2009/0182725 A1* | 7/2009 | Govani | G06F 17/30864 |
| 2010/0114882 A1 | 5/2010 | Wiegering et al. | |
| 2010/0299324 A1* | 11/2010 | Truve et al. | 707/725 |
| 2011/0029636 A1* | 2/2011 | Smyth | G06F 17/3089 709/217 |
| 2011/0314006 A1* | 12/2011 | Sweeney et al. | 707/723 |
| 2012/0150833 A1* | 6/2012 | Parthasarathy et al. | 707/706 |
| 2013/0066885 A1* | 3/2013 | Komuves | G06Q 10/10 707/748 |
| 2013/0159506 A1* | 6/2013 | Stern | G06F 17/30 709/224 |

* cited by examiner

*Primary Examiner* — Jeff A Burke
(74) *Attorney, Agent, or Firm* — Steven M. Greenberg, Esq.; Shutts & Bowen LLP

(57) ABSTRACT

Embodiments of the present invention provide a system and computer program product for ranking search results based upon content creation trends. In an embodiment of the invention, a computer program product for ranking search results based upon content creation trends includes a computer readable storage medium having computer readable program code for first receiving a set of results from a search engine produced in response to a search engine query of one or more search terms, for ranking the results of the result set according to at least one ranking factor, for retrieving trend data for terms associated with either or both of the results and/or the search terms, and for weighting the ranked results in the result set according to the retrieved trend data.

11 Claims, 2 Drawing Sheets

RANKING SEARCH RESULTS BASED UPON CONTENT CREATION TRENDS

BACKGROUND OF THE INVENTION

Field of the Invention

The present invention relates to the field of content searching and more particularly to the prioritized display of search results for content searches.

Description of the Related Art

Content browsing refers to the retrieval and presentation of electronic content in a browser client. Content generally can include electronic documents, messages, audio, audiovisual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material.

Given the vast amount of content published for accessibility over the Internet, one cannot enjoy an awareness of a possible content of interest available for access over the Internet. Search engines fill the gap by providing an interface through which end users can instruct searches for documents according to one or more search terms. Basic search engines permit simple term searches where the presence of one or more search terms in content result in the return of a reference to the located content. More sophisticated search engines permit boolean searching and even more sophisticated search engines allow for natural language searching.

Where search terms are provided in a search engine, the results often reflect the relevance of a "hit" based upon a percentage of search terms present in the located content. Yet, in many cases, the search terms provided are not intended to be located in desired content. Rather, search engines frequently permit one to require the omission of any content containing a search term. In boolean terms, the NOT operation is permitted as well as the AND and OR operations. In any event, where the result list from a search is large, the returned document of greatest interest may be obscured from apparent view by the end user. Accordingly, prioritizing a list returned documents to render those of utmost interest can be of paramount importance.

Current methods for prioritizing the display of documents in a list of search results include providing advantage to documents which are more relevant to the query, documents which are updated recently, documents which are linked to by other documents often, and documents which are often selected in other similar searches. Some search engines do include the most recent content from particular feeds (like recent "Twitter™" entries, related to a given query. While these methods go a long way in presenting the user documents in most efficient form, these methods still leave a lot to be desired.

BRIEF SUMMARY OF THE INVENTION

Embodiments of the present invention address deficiencies of the art in respect to search result prioritization and provide a novel and non-obvious system and computer program product for ranking search results based upon content creation trends. In an embodiment of the invention, a computer program product for ranking search results based upon content creation trends includes a computer readable storage medium having computer readable program code embodied therewith, the computer readable program code for first receiving a result set of results from a search engine produced in response to a search engine query of one or more search terms. The computer program product additionally includes computer readable program code for ranking the results of the result set according to at least one ranking factor. The computer program product yet further includes computer readable program code for retrieving trend data for either or both of terms associated with results and/or the search terms themselves. Finally, the computer program product includes computer readable program code for weighting the ranked results in the result set according to the retrieved trend data.

In one aspect of the embodiment, the weighting of the ranked the results in the result set according to the retrieved trend data can include computing a weight for each ranking of a corresponding one of the results in the result set based upon:

(1) a combination of a mutual expectation function measuring of how likely a given one of the search terms of the search engine query giving rise to the corresponding one of the results and an additional search term not included in the search engine query will occur together, (2) a mutual dependency function measuring how strongly the additional term relates to the given one of the search terms in current content creation, and (3) a relevancy to function calculating a relevancy of the given one of the search terms to the corresponding one of the results.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for ranking search results based upon content creation trends. In accordance with an embodiment of the invention, a search engine can process a search query for content disposed in a content repository such as the World Wide Web. The search query can include one or more search terms and can result in a result set of different documents. The documents can be ranked according to one or more factors. At least one of the factors can include trend data for content accessed in the content repository or alternatively, trend data for search terms used to request access to content in the content repository. In this regard, trend data can be received for not only terms of previously retrieved content, but also other words having a degree of relatedness to the terms. In this regard, trend data can include a degree to which particular documents associated with particular words have been requested and/or retrieved by other users accessing the content repository. Thereafter, the ranking of each of the documents in the result set can be weighted by the trend data and the result set can be sorted accordingly and presented in response to the search query.

Figure 1:
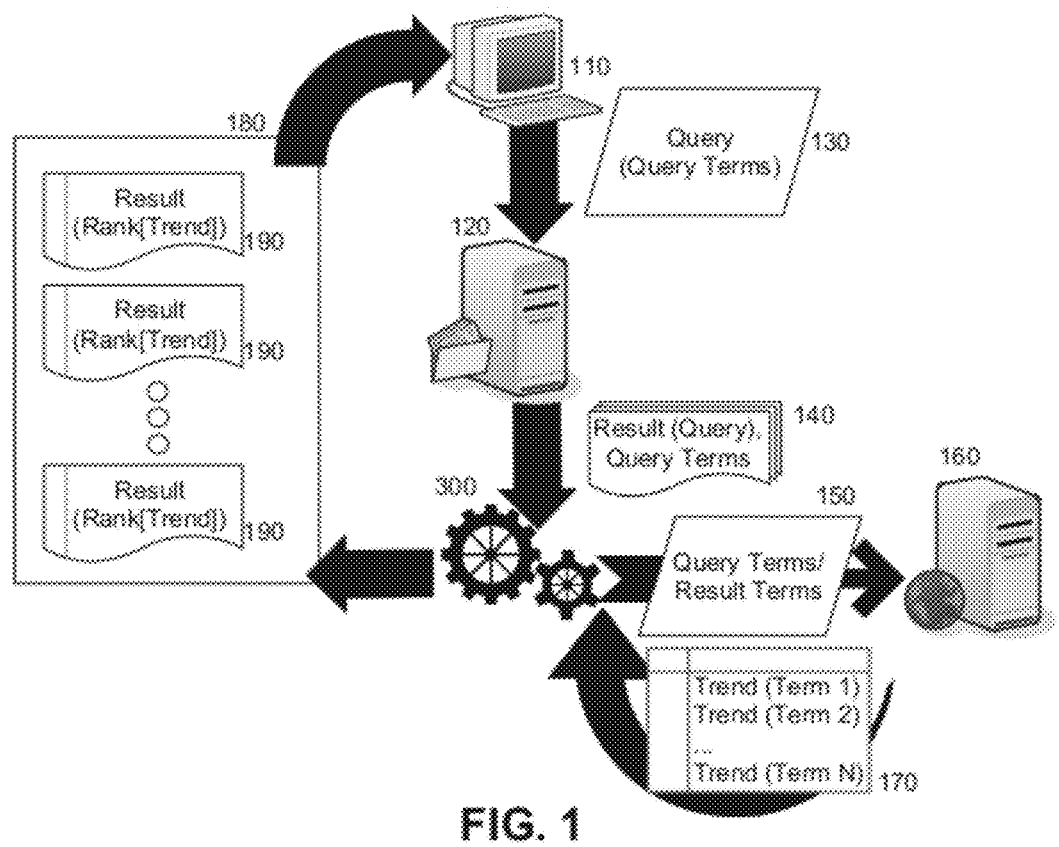
FIG. 1 is a pictorial illustration of a process for ranking search results based upon content creation trends.

In further illustration, FIG. 1 pictorially shows a process for ranking search results based upon content creation trends. As shown in FIG. 1, a computing device 110, such as a personal computer, personal digital assistant, mobile telephone and the like, can issue a query 130 for content from a content repository 120 by way of a search engine 300 configured to perform a trend based ranking process. The query 130 can include one or more search terms 150 to be accounted for in the boolean context as either an "OR" or "AND" or "NOT" (or both) with respect to one another. The search engine 300 can return a result set 140 and either terms found in the result set 140, or the search terms 150 of the query 130 (or both) can be provided to a trend feed 160 to determine trend data 170 for the search terms 150 of the query 130. In this regard, the trend data 170 is a degree to which particular content associated with the terms have been requested and/or retrieved by other users accessing the content repository, or created by other users for example in the form of blog entries, wiki pages, news stories, twitter tweets and the like, and can be provided by a trend service such as the "Insights"™ tool provided by Google Inc. of Mountain View, Calif., United States.

The trend based ranking process can prioritize the result set 140 according to the trend data 170 in order to produce a prioritized result set 180 of results 190 each ranked according to the trend data 170. In this regard, the computing ranking of the results 190 individually can be weighted to enhance the ranking when the trend data 170 indicates that a given one of the results 190 includes corresponding ones of the search terms 150 (and related terms not included as part of the search terms 150 determined from trending content) that are contemporaneously trending popular. In contrast, the ranking for ones of the results 190 that include corresponding search terms 150 not contemporaneously trending popular are not weighted accordingly. Once the prioritized result set 180 has been produced, the prioritized result set 180 can be provided to the computing device 110 for rendering.

Figure 2:
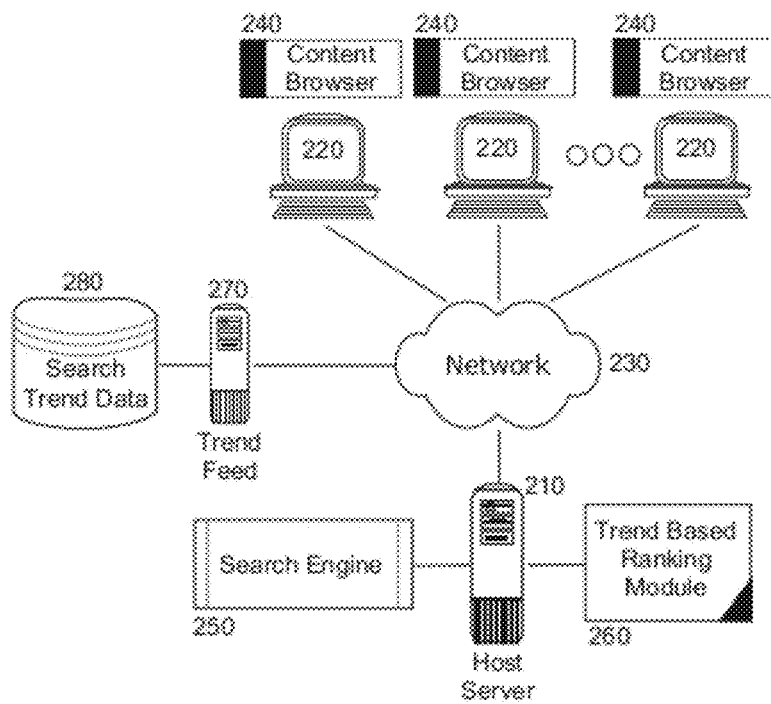
FIG. 2 is a schematic illustration of a search results data processing system configured for ranking search results based upon content creation trends; and, FIG. 3 is a flow chart illustrating a process for ranking search results based upon content creation trends.

The process illustrated in connection with FIG. 1 can be implemented in a search results data processing system. In yet further illustration, FIG. 2 schematically shows a search results data processing system configured for ranking search results based upon content creation trends. The system can include a host server 210 configured for communicative coupling to different computing devices 220 over computer communications network 230. The host server 210 can include a search engine 250 executing in the memory of the host server 210. Further, each of the computing devices 220 can include a corresponding content browser 240 operable to issue search engine queries against the search engine 250.

Of note, a trend based ranking module 260 can be coupled to the search engine 250 and can execute in the memory of the host server 210. The trend based ranking module 260 also can be communicatively coupled to a trend feed 270 serving trend data 280 for search terms provided to the trend feed 270. The trend based ranking module 260 can include program code enabled upon execution in the memory of the host server 210 to modify the rank order of search results in a result set produced in response to a search engine query in the search engine 250 by determining the trend data for the terms of the search engine query from the trend feed 270. Thereafter, each ranking of the search results in the result set can be weighted to increase the ranking where one or more terms appearing in the search engine query, or one or more related terms not appearing in the search engine query, are trending popular according to the search trend data 280. Conversely, the rankings of search results in the result set that result from search terms not trending popular according to the search trend data 280 are not weighted to increase.

Figure 3:
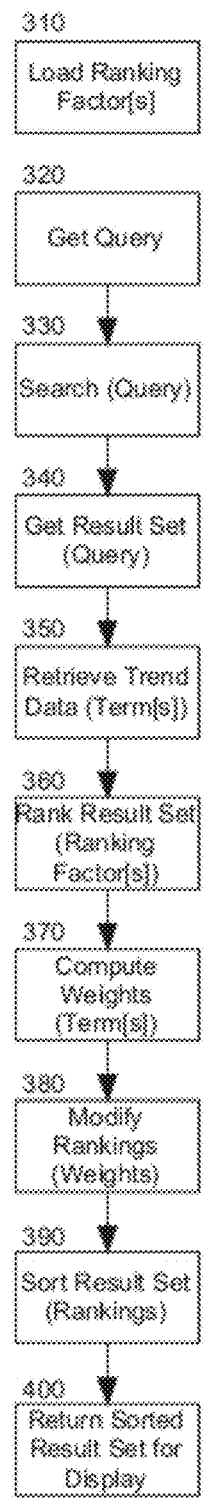

In even yet further illustration of the operation of the trend based ranking module 260, FIG. 3 is a flow chart illustrating a process for ranking search results based upon content creation trends. Beginning in block 310, one or more ranking factors can be loaded for use in ranking search results in a search result set. Those ranking factors can include, for example, search results which are more relevant to a search query, search results that are updated more recently, search results linked to by other documents often, or search results which are often selected in other similar searches. In block, 320, a search engine query can be received and can include one or more search terms. Thereafter, in block 330, the search engine query can be passed for processing in a search engine and in block 340, a result set of search results can be received from the search engine. In block 350, trend data also can be received for the term or terms as the case may be of the search engine query. In block 360, the results of the result set can be ranked according to the loaded ranking factors.

In block 370, a selection of weights can be computed for each of the results in the result set based upon the search terms in the search engine query and also for zero or more related terms not specified in the search engine query. For instance, for each result in the results set, the ranking for the result can be enhanced by a factor that depends upon the "trendiest" query containing the search engine query for the result. By way example, the ranking for a result in the result set can be multiplied by the weight M, which is defined as:

$$M(A,B):=1+\text{Max}(\text{MutualExpectation}(A,b)*\text{MutualDependency}(A,b)*\text{RelevancyTo}(b), \text{ for every set } `b` \text{ in } (B)*A\text{Constant}$$

where A is the set of terms in the search engine query, and B is the set of all sets of additional terms that may be relevant to the results in the result set of the search engine query, and AConstant can be selected to change the importance of the trendiness of sub-topics.

The MutualExpectation function in turn is a measure of how likely A and B will occur together as follows: MutualExpectation (A,B):=P(A & B). Additionally, the MutualDependency function is a measure of how strongly the additional terms relate to the terms of the search engine query incurrent content creation as follows:

$$\text{MutualDependency}(A,B):=P(A\&B)/(P(A)*P(B))=P(A|B)P(B|A)/P(A\&B)$$

Finally, the RelevancyTo function is defined in the same manner that the search engine already calculates relevancy of the normal terms of a search engine query to a result in question.

Returning now to FIG. 3, in block 380, each of the rankings for the results in the result set can be modified according to the computed weights. In block 390, the results in the result set can be sorted according to the modified rankings. Finally, in block 400 the sorted result set can be returned for display in response to the search engine query.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Further, with specific reference to a computer readable storage medium, it is to be understood that a storage medium excludes transitory media such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A computer program product for ranking search results based upon content creation trends, the computer program product comprising:
   a non-transitory computer readable storage medium having computer readable program code embodied therewith, the computer readable program code comprising:
   computer readable program code for receiving a result set of results from a search engine produced in response to a search engine query of a plurality of search terms;
   computer readable program code for ranking the results of the result set according to at least one ranking factor;
   computer readable program code for identifying one or more related terms related to the search terms and submitting both the search terms and the related terms by the processor to a trend feed over a computer communications network, and retrieving in response, trend data indicating which of the search terms are trending popular and which of the search terms are not trending popular;
   computer readable program code for identifying ones of the results in the result set present in the result set in correspondence to ones of the search terms and the related terms determined to be trending popular according to the retrieved trend data and weighting the ranked results in the result set according to the retrieved trend data by multiplying ones of the results in the results set by a numerical factor the multiplication increasing a corresponding ranking for each of the ones of the ranked results; and,
   computer readable program code for displaying the weighted ranked results in response to the search engine query;
   whereby the weighted ranked results produces a prioritized results set of results most likely to be popular according to the trend data for the search terms and the related terms of the query giving rise to the results weighted most heavily.

2. The computer program product of claim 1, wherein the computer readable program code for ranking the results of the result set comprises computer readable program code for ranking the results of the result set according to relevance of the results of the result set to the search engine query.

3. The computer program product of claim 1, wherein the computer readable program code for ranking the results of the result set comprises computer readable program code for ranking the results of the result set according to search results that have been updated more recently.

4. The computer program product of claim 1, wherein the computer readable program code for ranking the results of the result set comprises computer readable program code for ranking the results of the result set according to search results linked to by other results often.

5. The computer program product of claim 1, wherein the computer readable program code for ranking the results of the result set comprises computer readable program code for ranking the results of the result set according to search results which have been frequently selected in response to other similar searches.

6. The computer product of claim 1, wherein the computer readable program code for weighting the ranked the results comprises weighting the ranked results in the result set according to the retrieved trend data by multiplying at least the portion of the ranked results in the results set by the numerical weight based upon the adjustable numerical value indicating the importance of the trendiness of the topic, by computing the numerical weight for each ranking of a corresponding one of the results in the result set based upon a combination of a mutual expectation function measuring how likely a given one of the search terms of the search engine query giving rise to the corresponding one of the results and an additional search term not included in the search engine query will occur together, a mutual dependency function measuring how strongly the additional term relates to the given one of the search terms in current content creation, and a relevancy to function calculating a relevancy of the given one of the search terms to the corresponding one of the results.

7. A search results data processing system configured for ranking search results based upon content creation trends, the system comprising:
   a host server with at least one processor and memory and configured for communicatively coupling to different computing devices over a computer communications network;
   a search engine executing in the memory of the host server and providing result sets of different results from respectively different search engine queries received from the computing devices over the computer communications network; and,
   a trend based ranking module coupled to the search engine and comprising program code that when executed in the memory of the host server identifies one or more related terms related to the search terms and submits both the search terms and the related terms to a trend feed over the computer communications network, and retrieves in response, trend data indicating which of the search terms are trending popular and which of the search terms are not trending popular, identifies ones of the results in the result set present in the result set in correspondence to ones of the search terms and the related terms determined to be trending popular according to the retrieved trend data and weights the ranked results in the result set according to the retrieved trend data by multiplying the ones of the results in the results set by a numerical factor the multiplication increasing a corresponding ranking for each of the ones of the ranked results, and displays the weighted ranked results in response to the search engine query, whereby the weighted ranked results produces a prioritized results set of results most likely to be popular according to the trend data for the search terms and the related terms of the query giving rise to the results weighted most heavily.

8. The system of claim 7, the search engine ranks the results of the result set according to relevance of the results of the result set to the search engine query.

9. The system of claim 7, the search engine ranks the results of the result set according to search results that have been updated more recently.

10. The system of claim 7, the search engine ranks the results of the result set according to search results linked to by other results often.

11. The system of claim 7, the search engine ranks the results of the result set according to search results which have been frequently selected in response to other similar searches.

\* \* \* \* \*